United States Patent [19]
Tanoue

[11] Patent Number: 5,608,765
[45] Date of Patent: Mar. 4, 1997

[54] RADIO FRAME SYNCHRONIZATION SYSTEM

[75] Inventor: Katsumi Tanoue, Tokyo, Japan

[73] Assignee: NEC Corporation, Tokyo, Japan

[21] Appl. No.: 500,359

[22] Filed: Jul. 10, 1995

[30] Foreign Application Priority Data

Jul. 8, 1994 [JP] Japan .................................. 6-157264

[51] Int. Cl.$^6$ ...................................................... H04L 7/00
[52] U.S. Cl. .......................... 375/365; 375/356; 370/350; 455/54.1; 455/56.1
[58] Field of Search ................................. 375/356, 362, 375/365, 371; 370/95.1, 100.1, 103, 105.4, 105.5, 105.1, 104.1; 455/150, 54.1, 69, 51.1, 56.1

[56] References Cited

FOREIGN PATENT DOCUMENTS 58-131842 8/1983 Japan.
2-26135 1/1990 Japan.

Primary Examiner—Stephen Chin
Assistant Examiner—Thuy L. Nguyen
Attorney, Agent, or Firm—Foley & Lardner

[57] ABSTRACT

A radio frame synchronization system performs synchronization control of radio frames to be transmitted from a plurality of radio base stations respectively connected to wire lines to a mobile station. Each of the radio base stations includes a receiver, a sync signal detecting section, and a phase correcting section. The receiver receives a time-division radio signal to be transmitted from a distant radio base station in operation to the mobile station when a home radio base station is activated. The sync signal detecting section detects a sync signal from a reception output from the receiver. The phase correcting section generates a radio frame reference signal, indicating a timing at which a radio frame is transmitted to the mobile station, on the basis of a phase difference between the radio frame synchronization reference signal supplied from the wire line and the sync signal from the sync signal detecting section.

9 Claims, 3 Drawing Sheets

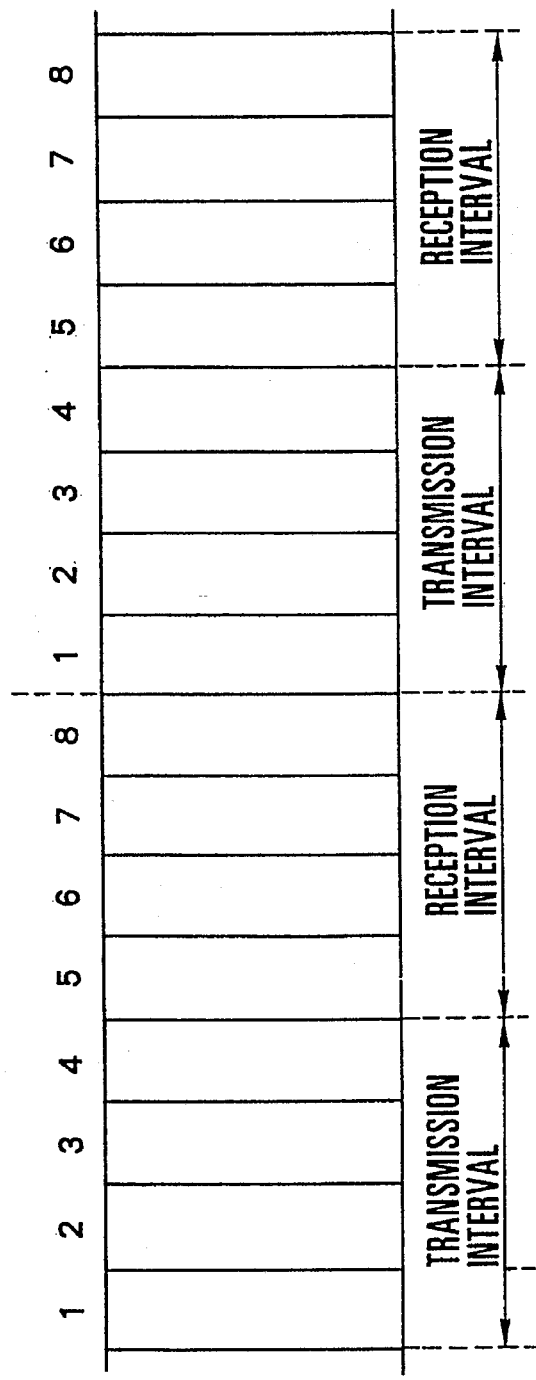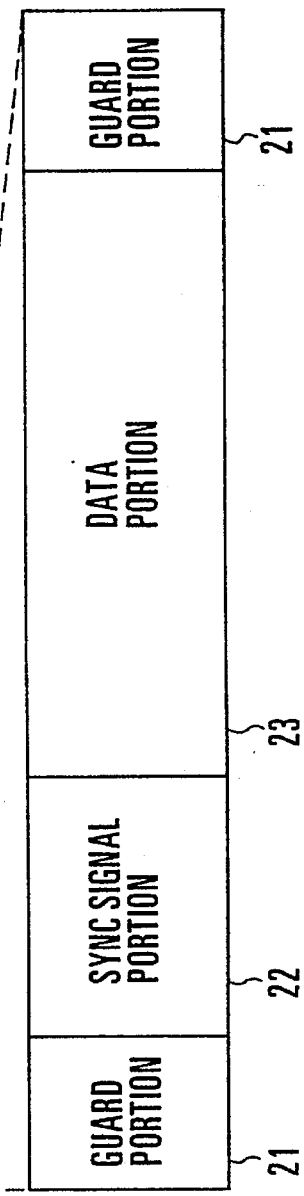

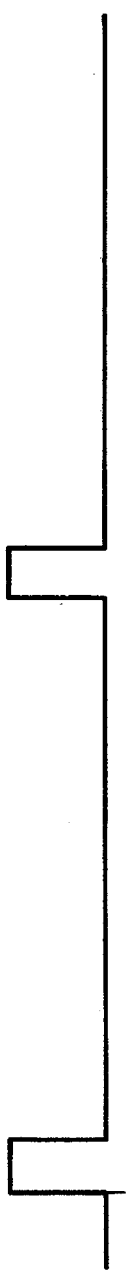
FIG. 3A REFERENCE CLOCK SIGNAL a
FIG. 3B PHASE CORRECTION SIGNAL b
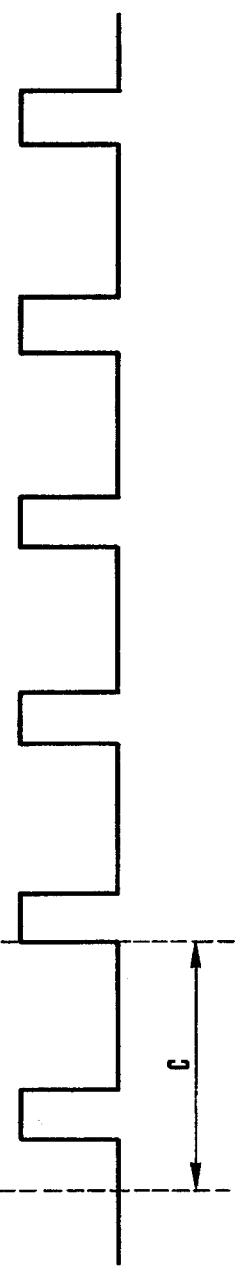
FIG. 3C FRAME TIMING SIGNAL d

RADIO FRAME SYNCHRONIZATION SYSTEM

BACKGROUND OF THE INVENTION

The present invention relates to a digital mobile communication system and, more particularly, to a radio frame synchronization system for controlling synchronization of a radio frame transmitted from a radio base station to a mobile station.

In a mobile communication system using digital signals, a technique of matching the phases of signals transmitted from radio base stations is indispensable to effective use of radio frequencies and incessant switching of radio channels.

As a first example of such a conventional technique, a technique like the one disclosed in Japanese Patent Laid-Open No. 58-131842 is available. According to this technique, a reference signal transmitted from a satellite is received by each radio base station, and a signal from a wire line is transmitted in synchronism with this reference signal.

As a second example, a technique like the one disclosed in Japanese Patent Laid-Open No. 2-26135 is available. According to this technique, a radio base station for transmitting a phase reference signal is installed, and the remaining radio base stations receive a phase reference signal from this radio base station. A signal from a wire line is then transmitted in synchronism with this phase reference signal.

In the first example, however, each radio base station must have a dedicated receiver for receiving a reference signal from the satellite. For this reason, each radio base station cannot be reduced in size. In the second example, a special radio base station for transmitting a phase reference signal is required.

SUMMARY OF THE INVENTION

It is an object of the present invention to provide a radio frame synchronization system which can be realized with a simple arrangement at a low cost without requiring a special device for a reference signal.

In order to achieve the above object, according to the present invention, there is provided a radio frame synchronization system for performing synchronization control of radio frames to be transmitted from a plurality of radio base stations respectively connected to wire lines to a mobile station, each of the radio base stations comprising reception means for receiving a time-division radio signal to be transmitted from a distant radio base station in operation to the mobile station when a home radio base station is activated, detection means for detecting a sync signal from a reception output from the reception means, and a reference signal generating means for generating a radio frame reference signal, indicating a timing at which a radio frame is transmitted to the mobile station, on the basis of a phase difference between the radio frame synchronization reference signal supplied from the wire line and the sync signal from the detection means.

BRIEF DESCRIPTION OF THE DRAWINGS

FIGS. 2A and 2B are timing charts showing the data transmission/reception timings of a digital mobile communication system; and FIGS. 3A to 3C are timing charts showing how the radio frame synchronization system in FIG. 1 generates a frame timing signal.

DESCRIPTION OF THE PREFERRED EMBODIMENT

Figure 1:
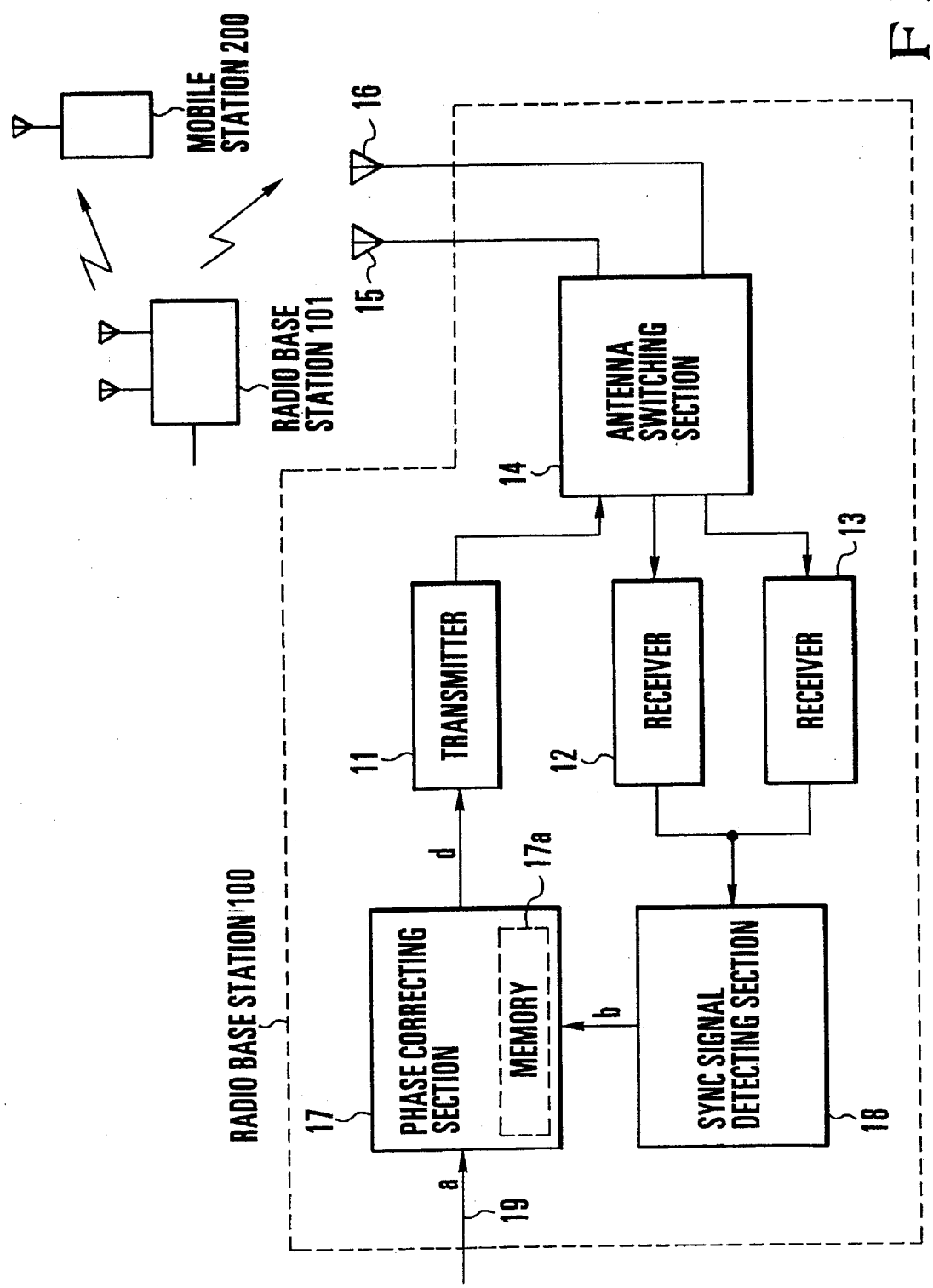
FIG. 1 is a block diagram showing a radio frame synchronization system according to an embodiment of the present invention.

An embodiment of the present invention will be described below with reference to the accompanying drawings.

FIG. 1 shows a radio frame synchronization system according to the present invention. Referring to FIG. 1, reference numerals 100 and 101 denote radio base stations constituting a digital mobile communication system for performing time-division communication; and 200, a mobile station.

The radio base station 100 includes a transmitter 11, two receivers 12 and 13 arranged side by side, an antenna switching section 14 for switching connection of the transmitter 11 and receivers 12 and 13 to antennas 15 and 16, a phase correcting section 17 as a radio frame reference signal generating means which has a memory 17a and serves to generate a frame timing signal on the basis of a reference clock signal a and a phase correction signal b and output the frame timing signal d to the transmitter 11, a sync signal detecting section 18 for generating the phase correction signal b from signals received from the receivers 12 and 13 and outputting the phase correction signal b to the phase correcting section 17, and a wire line 19 to which the phase correcting section 17 is connected to supply the reference clock signal a thereto.

The radio base stations 100 and 101 constituting the digital mobile communication system are respectively arranged in different areas. As described above, each of the radio base stations 100 and 101 having the same arrangement incorporates the one transmitter 11 and the two receivers 12 and 13. These transmitter 11 and receivers 12 and 13 are connected to the antennas 15 and 16 via the antenna switching section 14. The antenna switching section 14 performs switching control to connect the antennas 15 and 16 to the receivers 12 and 13, respectively, in the reception intervals of the radio base stations 100 and 101. These two receivers 12 and 13 perform diversity reception to select a reception system in radio communication with the mobile station 200 on the basis of reception level, reception quality, and the like. In the transmission intervals of the radio base stations 100 and 101, the antenna switching section 14 connects the transmitter 11 to one of the antennas 15 and 16 which corresponds to the reception system selected in the previous frame reception.

For the sake of descriptive convenience, assume that the radio base station 100 is a home station, and the radio base station 101 is a distant station as a neighboring radio base station. In the radio base station 100, when the power switch is turned on to start an operation, the antennas 15 and 16 are respectively connected to the receivers 12 and 13 to determine a transmission reference timing. Radio signals transmitted from the neighboring radio base station 101 to the mobile station 200 are received by the receivers 12 and 13 via the antennas 15 and 16 and the antenna switching section 14. The received signals are output to the sync signal detecting section 18. The sync signal detecting section 18 detects a sync signal from the received signals output from the receivers 12 and 13, and outputs the phase correction signal b to the phase correcting section 17. The phase correcting section 17 generates a transmission reference timing of the home station on the basis of the reference clock signal a supplied from the wire line 19 and the phase correction signal b from the sync signal detecting section 18, and supplies a transmission reference timing signal d to the transmitter 11.

A phase correcting operation in the radio base station 100 will be described in detail next with reference to the timing charts of FIGS. 2A and 2B and 3A to 3C. FIGS. 2A and 2B show the frame arrangement of a PHS (Personal Handyphone System) to which the radio base station 100 is applied. Referring to FIG. 2A, each of a plurality of continuous radio frames is constituted by eight time slots ① to ⑧ which are time-divisionally transmitted/received. Eight time slots ① to ⑧ are grouped into a transmission interval having four time slots ① to ④ and a reception interval having four time slots ⑤ to ⑧.

As shown in FIG. 2B, each time slot has a signal format constituted by guard portions 21, a sync signal portion 22, and a data portion 23. In this case, the data of the sync signal portion 22 is data having a common parameter in the system. For this reason, the sync signal portion 22 can be detected by receiving transmission data from the distant radio base station 101 in the system. That is, the sync signal detecting section 18 detects the data of the sync signal portion 22, i.e., a sync signal, from transmission data from the distant radio base station 101.

The reference clock signal a shown in FIG. 3A is supplied to the phase correcting section 17 via the wire line 19. In addition, the phase correction signal b shown in FIG. 3B, which is generated on the basis of the sync signal detected from the transmission data from the distant radio base station 101, is supplied from the sync signal detecting section 18 to the phase correcting section 17. The phase correcting section 17 obtains a phase difference c between the reference clock signal a and the phase correction signal b and stores the phase difference c in the memory 17a. At the same time, as shown in FIG. 3C, the phase correcting section 17 supplies the frame timing signal d to the transmitter 11 in synchronism with the phase correction signal b on the basis of the phase difference c.

Note that since the frame timing signal d is autonomically generated in the radio base station 100, the phase difference between the frame timing signal d and the reference clock signal a may change after the lapse of a predetermined period of time. For this reason, synchronization of the frame timing signal d is performed at predetermined intervals on the basis of the phase difference c stored in the memory 17a.

With this operation, the phase difference between the frame timing of the reference radio base station 101 which has received the sync signal and that of the radio base station 100 is eliminated. Therefore, the phase difference between transmission signals transmitted from the radio base stations 100 and 101 to the mobile station 200 can be eliminated.

As has been described above, according to the present invention, when the power switch is turned to start an operation, the home radio base station receives a radio signal to be transmitted from the distant radio station to a mobile station, and detects a sync signal from this received signal. In addition, a radio frame reference signal is generated on the basis of the phase difference between a radio frame synchronization reference signal from a wire line and the detected sync signal. Therefore, the phases of radio signals transmitted from radio base stations can be synchronized without using any dedicated phase reference signal generating radio station or any dedicated reference signal generator.

In addition, the phase difference between a radio frame synchronization reference signal and a sync signal is stored, and the generation timing of a radio frame reference signal is periodically corrected on the basis of the stored phase difference. Therefore, the phase difference between the radio frame reference signal and the radio frame synchronization reference signal can be properly corrected.

What is claimed is:

1. A radio frame synchronization system for performing synchronization control of radio frames to be transmitted from a plurality of radio base stations respectively connected to wire lines and being capable of communicating with a mobile station via an over-the-air connection, each of said radio base stations comprising:

reception means for receiving a time-division radio signal including a sync signal to be transmitted from a distant radio base station in operation to said mobile station when a home radio base station is activated;

detection means for detecting the sync signal of the received radio signal from a reception output from said reception means; and a reference signal generating means for generating a radio frame reference signal, said radio frame reference signal indicating a timing at which a radio frame is transmitted to said mobile station, on a basis of a phase difference between a radio frame synchronization reference signal supplied from the corresponding wire line and the sync signal which is output from said detection means.

2. A system according to claim 1, wherein said reference signal generating means comprises memory means for storing a phase difference between the radio frame synchronization reference signal and the sync signal, and a generation timing of the radio frame reference signal is corrected at predetermined intervals on a basis of the phase difference stored in said memory means.

3. A system according to claim 1, wherein each of said radio base stations further comprises a transmitter for transmitting the radio frame to said mobile station in synchronism with the radio frame reference signal from said radio frame reference signal generating means.

4. A system according to claim 1, wherein the radio synchronization reference signal supplied to said reference signal generating means via the wire line is a reference clock signal.

5. A system according to claim 1, wherein the radio frame transmitted from said radio base station to said mobile station is constituted by a plurality of time slots which respectively have sync signal portions and are time-divisionally transmitted, and said detection means detects the sync signal from the sync signal portion of each time slot received by said reception means.

6. A radio frame synchronization system for performing synchronization control of radio frames to be transmitted over-the-air from a plurality of radio base stations to a mobile station, each of said radio base stations being respectively connected to a wire line for receiving a reference clock signal, each of said radio base stations comprising:

reception means for receiving a time-division radio signal transmitted from another of said radio base stations that is presently communicating with said mobile station;

detection means for detecting a sync signal within said time-division radio signal received by said reception means; and reference signal generating means for generating a radio frame reference signal, said radio frame reference signal indicating a timing at which a radio frame is transmitted to said mobile station by said another of said radio base stations based on a phase difference between the reference clock signal supplied from said corresponding wire line and the sync signal which is output from said detection means.

7. A system according to claim 6, wherein said time-division radio signal includes a start guard portion, a sync signal portion, a data portion, and an end guard portion, and wherein said sync signal is included in said sync signal portion which is situated between said start guard portion and said end guard portion.

8. A system according to claim 6, wherein the reception means is configured to receive the time-division radio signal only for a fixed period of time after which the corresponding radio base station is powered on.

9. A system according to claim 8, wherein said reference signal generating means comprises memory means for storing the phase difference between the reference clock signal and the sync signal, and wherein a generation timing of the radio frame reference signal is corrected at predetermined intervals based on the phase difference stored in said memory means.

* * * * *